Dec. 4, 1945.  D. M. BORDEN  2,390,043
CONTROL APPARATUS
Filed April 13, 1944
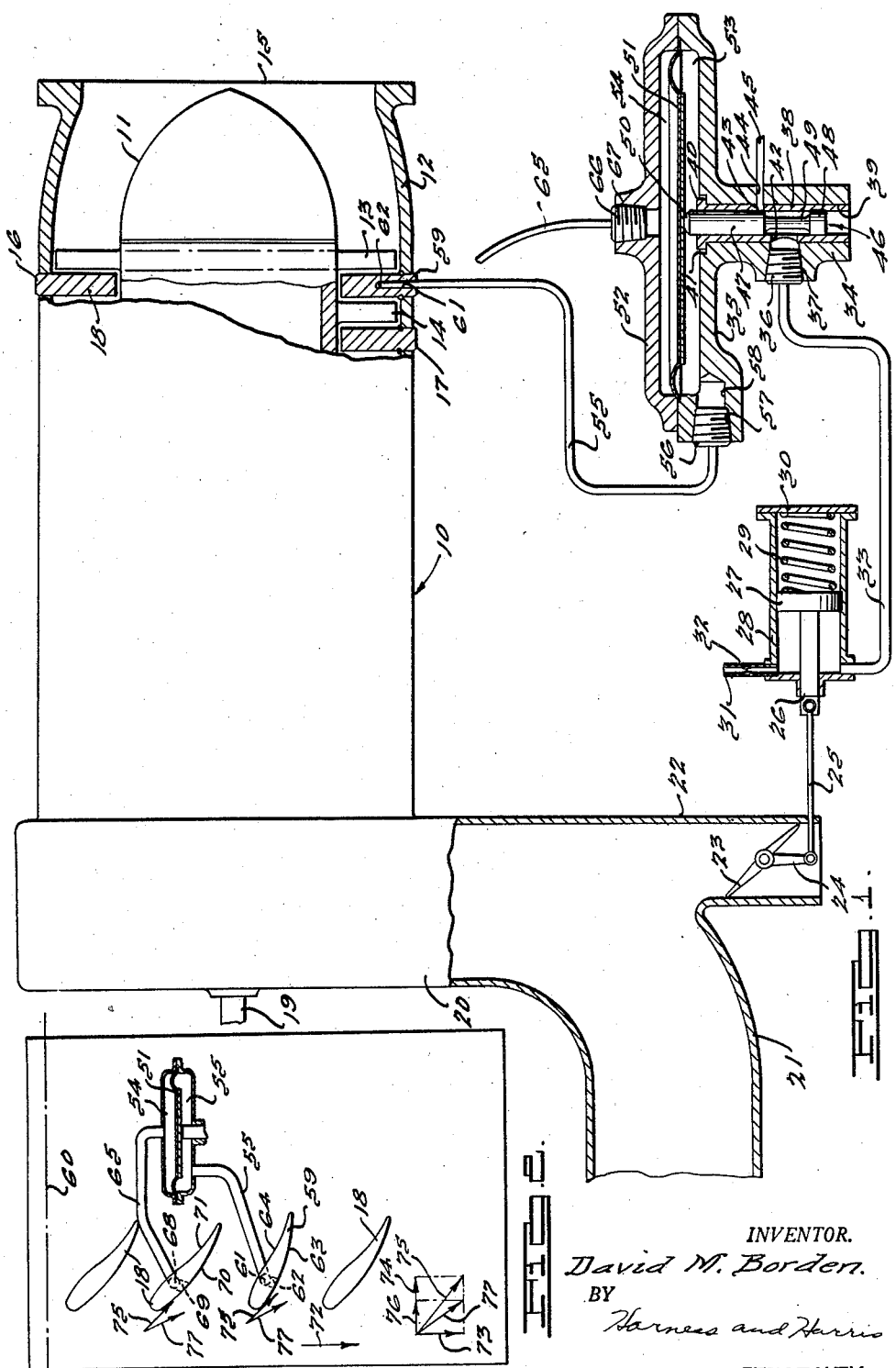
INVENTOR.
David M. Borden.
BY
Harness and Harris
ATTORNEYS.

Patented Dec. 4, 1945

2,390,043

UNITED STATES PATENT OFFICE 2,390,043

CONTROL APPARATUS

David M. Borden, Royal Oak, Mich., assignor to Chrysler Corporation, Highland Park, Mich., a corporation of Delaware Application April 13, 1944, Serial No. 530,927

5 Claims. (Cl. 230—115)

This application relates to an apparatus for controlling a supercharger. More specifically it relates to an apparatus for preventing a supercharger from reaching or exceeding the pumping limit.

It is known that superchargers, particularly those of the axial type, may under certain conditions reach a condition known as "pumping limit," at which the flow of gas through the machine is unsatisfactory. The velocity of the gas passing into the supercharger becomes too low for the rotational speed of the blades and associated parts. The gas meets the blades at too great an angle of attack, aerodynamic flow is interrupted, and the supercharger stalls. This condition produces noises and vibrations and pulsations that may cause physical failure of the parts.

If a supercharger is to be used only at one altitude, it is not difficult to design it so that it may be operated satisfactorily within the pumping limit. However, if the supercharger is to be used at different altitudes as is the case when it is part of an aircraft power plant, the greatly varying intake pressures cause pumping limit to occur under varying conditions, and it is very difficult to make the supercharger operate within the pumping limit at all times.

It has been discovered that when pumping limit occurs, there is a disturbance or change in the relation of the pressures of certain regions of the machine. I propose to put this disturbance or change to work to take the supercharger away from the pumping limit.

An object of the present invention is to provide an improved control for a supercharger, particularly one of the axial type. More specifically the control is adapted to prevent the supercharger from reaching the pumping limit.

A further object is to produce a control for a supercharger for preventing the supercharger from reaching or exceeding the pumping limit, which control operates directly upon a phenomenon arising at a condition of pumping limit. The advantage in providing a control of this type is that it is more direct and is less dependent on a maze of complications such as operating characteristics of the supercharger at varying temperatures and pressures.

Other objects will appear from the disclosure.

In the drawing:

Fig. 1 is a view partially in section and partially in diagrammatic form showing the invention of the present application; and Fig. 2 is a developed view of a portion of a blade stage of the supercharger employed in the present invention.

A supercharger 10 comprises a rotor 11 and a stationary casing member 12. Upon the rotor 11 is mounted a plurality of blade stages, of which stages 13 and 14 adjacent a receiving end 15 of the supercharger 10 are shown. The stationary member 12 carries a plurality of blade stages of which the first two stages 16 and 17 adjacent the receiving end 15 of the supercharger are shown. The first stationary stage 16, or in other words, the first stage associated with the stationary casing member 12 comprises a plurality of blades 18. The rotor is driven by a shaft 19 projecting from the left end of the supercharger 10 as shown in Fig. 1 and is journalled on bearing means, not shown, at this end of the supercharger. The left end forms a discharge portion 20 connected with a line 21 leading to an engine, not shown. At one point of the line 21 is a tubular part 22 carrying a spill valve 23. An arm 24 secured to the spill valve 23 is connected to a link 25 connected in turn to a stem 26 on a piston 27. The piston 27 is mounted in a cylinder 28 and is urged to the left, as viewed in Fig. 1, by a coil spring 29 acting between the piston 27 and between a plate 30 at the right end of the cylinder 28. A pressure line 31 having a restriction 32 therein supplies fluid under pressure to the cylinder 28. A line 33 leads from the cylinder 28 to a tubular portion 34 of a casing part 35. One end of the line 33 is secured in a plug 36 threaded in an opening 37 in the tubular portion 34. A sleeve 38 is fixedly mounted in a bore 39 in the tubular portion 34 and has a flange 40 resting in an enlarged portion 41 at the end of the bore 39. The sleeve 38 has a port 42 at the opening 37 in the tubular portion 34 and at its opposite side a port 43 at an opening 44 in the tubular portion 34 at which a drain line 45 is connected. Slidably mounted within the sleeve 38 is a piston valve 46 having a long section 47, a short section 48, and a reduced section 49 joining the sections 47 and 48. The long section 47 has a rounded end 50 which is connected to diaphragm 51 clamped between the casing part 35 and a mating casing part 52. The diaphragm 51 divides the space enclosed by the casing parts 35 and 52 into a lower chamber 53 and an upper chamber 54.

A line 55 secured in a plug 56 threaded in an enlarged portion 57 of an opening 58 in the casing part 35 leads from the chamber 53 to a special blade 59 secured to the stationary casing member 12. As is evident from Fig. 2 the special blade 59 is mounted in the stationary casing member 12 in place of one of the regular blades 18 of the first stationary stage 16. The special blade 59 is at a lesser angle to the axis of rotation of the rotor 11, represented by the dash-dot line 60 at the top of Fig. 2, than are the regular blades 18. The line 55 is connected to a lengthwise passage 61 extending from the root of the blade 59 to a midpoint in the blade at which point it is connected to a transverse passage 62 opening into a face 63 of the blade 59, which is more cambered than an opposite face 64 of the same blade. A line 65 secured within a plug 66 threaded in an opening 67 in the casing part 52 leads from the chamber 54 to a blade 18 adjacent the special blade 59. The connection of the line 65 to the blade 18 is the same as the connection of the line 55 to the special blade 59, although the former is not shown in Fig. 1. As may be seen in Fig. 2, the line 65 is connected to a lengthwise passage 68 in the blade 18 terminating in a cross-passage 69 opening into a face 70 of the blade 18, which is more cambered than an opposite face 71. The passage 69 is at a midpoint of the length of the blade 18 as is the passage 62 in the special blade 59.

It will be apparent that the chambers 53 and 54 are subjected respectively to the pressures at the faces 63 and 70 of the blades 59 and 18. The relationship of these pressures determines the position of the diaphragm 51 and of the piston valve 46. Fig. 1 shows the diaphragm and piston valve in the position which they occupy when the supercharger is at rest. At this time the pressure in the chambers 53 and 54 are equal since the pressures on the faces 63 and 70 of the blades 59 and 18 are equal. Let it now be assumed that the supercharger 10 is operating with the rotor 11 and its blades moving past the blades 18 and 59 in the direction indicated by the arrow 72. The moving blades exert a force or effect a velocity of the air, tending to cause flow of the air in a direction indicated by an arrow 73 transverse to the axis of rotation represented by the line 60. During normal operation of the supercharger within the pumping limit, the air moves through the supercharger with a component of flow represented by the arrow 74. The actual flow of the air is in the direction indicated by the arrows 75. The arrow 75 shown applied to the one blade 18 has a direction along the face 70 of the blade and the corresponding arrow 75 applied to the special blade 59 as an arrow somewhat away from the face 63. There are negative pressures developed at these faces and the negative pressure at the face 63 is somewhat greater than that at the face 70. Thus the negative pressure in the chamber 53 is somewhat greater than in chamber 54 and the piston valve 46 is somewhat lower than its position in Fig. 1, the section 47 blocking the passage of fluid from the line 33 to the drain line 45. However, when a condition of stall arises such as is the case when the pumping limit of the supercharger 10 is approached or reached, the axial component 74 of the flow of air through the supercharger becomes materially reduced to an amount represented by an arrow 76. Resultant flow of the air is indicated by the arrows 77. As is evident from the comparison of the arrows 75 and 77, the direction of flow of the air is at a greater angle to the axis of rotation of the supercharger represented by the line 60. Although the direction of flow is somewhat away from the face 70 of the blade 18, this is not sufficient to cause a separation of flow of air along this face and there is an appreciable negative pressure at this region. However, the direction of flow is sufficiently away from the face 63 of the special blade 59 that a separation of flow takes place and the negative pressure is so reduced at the face 63 that it becomes less than that at the face 70. Thus when the condition of stall arises there is a reversal of pressure conditions at the faces 63 and 70 of the special blade 59 and the regular blade 18. This reversal of conditions is reflected in the chambers 53 and 54 for now the negative pressure of the chamber 54 is greater than that of the chamber 53. As a result, the diaphragm 51 and the piston valve 46 move upwardly causing the piston valve section 47 to uncover the port 43. Thus fluid may escape from the line 33 past the reduced section 49 of the piston valve 46 into the drain line 45. This reduction in pressure causes a shifting of the piston 27 in the cylinder 28. When there was no condition of stall and consequently no flow of fluid from the line 33 to the drain line 45 the pressure in the cylinder 28 was at a maximum. Consequently the piston 27 was at an extreme position to the right, acting through the stem 26, the link 25, and the arm 24 to hold the spill gate 23 in the closed position. With the arising of a condition of stall the passage of fluid from the line 33 to the drain line 45 reduces the pressure in the cylinder 28 allowing the piston 27 to move to the left. This leftward movement acts through the stem 26, the link 25, and the arm 24 to open the spill gate 23 and consequently. This reduction in pressure brings about a removal of the condition the flow of air through the supercharger is increased to the point where it is proper for the existing relation of intake and delivery pressures of the supercharger. Opening the spill gate 23 may provide an upper limit to the ratio of delivery pressure to intake pressure. Thus the supercharger is adjusted away from pumping limit or is prevented from exceeding pumping limit. When this takes place the original relationship of pressures in the chambers 53 and 54 is resumed and the diaphragm 51 and the piston valve 46 move back to the position of Fig. 1 in which the piston valve section 47 covers the port 43 thereby blocking flow of fluid from the line 33 to the drain line 45. This action causes an increase in the pressure of the fluid within the cylinder 28, and the piston moves to the right closing the spill gate 23.

It will be apparent from the foregoing description that a new apparatus has been developed for keeping a supercharger away from the pumping limit or for preventing it from exceeding the pumping limit. The device operates directly from conditions arising in the supercharger on approach or arrival of pumping limit and involves the use of reversal in the relation of pressures at a regular stationary blade and at another stationary blade at an angle different from that of the regular blade. The drawing shows that the regular blade, the pressure of which is employed in the operation of the device, is adjacent the special blade but this is for the purpose of illustration only, actually the regular blade may be any one of the regular blades of the stationary blade staging in which the special blade is located.

The special blade 59 has been associated with the first stationary blade stage nearest the inlet end 11 of the supercharger, because a condition of stall due to approach or arrival of the pumping limit generally occurs first at the inlet end of the supercharger. Although location of the special blade at this point may be desirable and advantageous, it is not an absolute necessity, for the same change in the flow may occur at another blade stage.

The intention is to limit the invention only within the scope of the appended claims.

I claim:

1. Apparatus for keeping within the pumping limit a supercharger having rotary and regular stationary blades, comprising a special stationary blade mounted on the supercharger adjacent the aforementioned regular stationary blades and being at a lesser angle to the axis of rotation than that of the regular stationary blades, a spill valve in the delivery line of the supercharger, means responsive to change in the relation of the pressures at a point of the special blade and a corresponding point of one of the regular stationary blades due to approach or arrival of the pumping limit, and means connecting the spill valve and the aforesaid means for causing approach or arrival of the pumping limit to increase the opening of the spill valve.

2. Apparatus for keeping within the pumping limit a supercharger having rotary and regular stationary blades, comprising a special stationary blade mounted on the supercharger adjacent the aforementioned regular stationary blades and being at a different angle to the axis of rotation from that of the regular stationary blades, a spill valve in the delivery line of the supercharger, means responsive to change in the relation of the pressures at a point of the special blade and a corresponding point of one of the regular stationary blades due to approach or arrival of the pumping limit, and means connecting the spill valve and the aforesaid means for causing approach or arrival of the pumping limit to increase the opening of the spill valve.

3. Apparatus for preventing the reaching or exceeding of the pumping limit by a supercharger having rotary and stationary blades, comprising a special stationary blade mounted on the supercharger adjacent the aforementioned regular stationary blades and being at a lesser angle to the axis of rotation than that of the regular stationary blades, a spill valve in the delivery line of the supercharger, means responsive to reversal in the difference of the pressures at the special blade and one of the regular stationary blades due to approach or arrival of the pumping limit, and means connecting the spill valve and the aforesaid means for causing approach or arrival of the pumping limit to increase the opening of the spill valve.

4. Apparatus for keeping within the pumping limit a supercharger having rotary and stationary blades, comprising a special stationary blade mounted on the supercharger adjacent the aforementioned regular stationary blades and being at a different angle to the axis of rotation from that of the regular stationary blades, a spill valve in the delivery line of the supercharger, means responsive to reversal in the difference of the pressures at a point of the special blade and a corresponding point of one of the regular stationary blades due to approach or arrival of the pumping limit, and means connecting the spill valve and the aforesaid means for causing approach or arrival of the pumping limit to increase the opening of the spill valve.

5. Apparatus for keeping within the pumping limit a supercharger having rotary and regular stationary blade stages alternately placed with respect to one another comprising a special stationary blade mounted adjacent a regular stationary blade staging near the inlet of the supercharger at a lesser angle to the axis of rotation than that of the stationary blade staging adjacent which it is mounted, a spill valve in the delivery line of the supercharger, and means responsive to change in the relation of pressures at a point the special blade and a corresponding point of the stationary blade staging adjacent which the special blade is mounted due to approach or arrival of the pumping limit for increasing the opening of the spill valve.

DAVID M. BORDEN.